United States Patent
VanDam et al.

(10) Patent No.: US 12,094,207 B2
(45) Date of Patent: Sep. 17, 2024

(54) OPERATION IDENTIFICATION OF SEQUENTIAL EVENTS

(71) Applicant: Baker Hughes Oilfield Operations LLC, Houston, TX (US)

(72) Inventors: Jeremy VanDam, Oklahoma City, OK (US); Christopher Blake, Oklahoma City, OK (US); Carlneil Domkam, Oklahoma City, OK (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 415 days.

(21) Appl. No.: 17/670,273

(22) Filed: Feb. 11, 2022

(65) Prior Publication Data

US 2022/0262118 A1 Aug. 18, 2022

Related U.S. Application Data

(60) Provisional application No. 63/149,659, filed on Feb. 15, 2021.

(51) Int. Cl.
G06V 20/40 (2022.01)
G06T 7/00 (2017.01)
(Continued)

(52) U.S. Cl.
CPC .......... *G06V 20/44* (2022.01); *G06T 7/0008* (2013.01); *G06T 7/73* (2017.01);
(Continued)

(58) Field of Classification Search
CPC .......... G06T 2207/30108; G06T 2207/30232; G06V 20/52; G06V 20/44;
(Continued)

(56) References Cited

U.S. PATENT DOCUMENTS

| 7,006,920 B2 * | 2/2006 | Newman ................. | E21B 41/00 |
| | | | 702/6 |
| 8,326,538 B2 * | 12/2012 | Hobbs ..................... | E21B 47/12 |
| | | | 73/152.01 |

(Continued)

FOREIGN PATENT DOCUMENTS

| GB | 2536710 A | | 9/2016 | |
| JP | 2015141563 A | * | 8/2015 | ......... G06K 9/00771 |

(Continued)

OTHER PUBLICATIONS

R. S. Filho et al., "Semi-Autonomous Industrial Robotic Inspection: Remote Methane Detection in Oilfield," 2018 IEEE International Conference on Edge Computing (EDGE), San Francisco, CA, USA, 2018, pp. 17-24, doi: 10.1109/EDGE.2018.00010. (Year: 2018).*

(Continued)

*Primary Examiner* — Michael Robert Cammarata
(74) *Attorney, Agent, or Firm* — Crowe & Dunlevy, P.C.

(57) ABSTRACT

A method for automatically determining whether an operator carried out a first operation on an asset positioned at a location includes the steps of installing a camera module at the location to observe the asset, sending image data from the camera module to an analytics center, processing the image data to automatically determine the identity of the operator or changes at the location resulting from the first operation, developing an event signature based on the image data, wherein the event signature is indicative of whether the first operation on the asset took place, and verifying the status of the first operation based on the event signature. Based on the step of verifying the status of the first operation, the methods can also be configured to automatically process an invoice for the first operation or automatically command a second operation.

17 Claims, 3 Drawing Sheets

Figure 1:
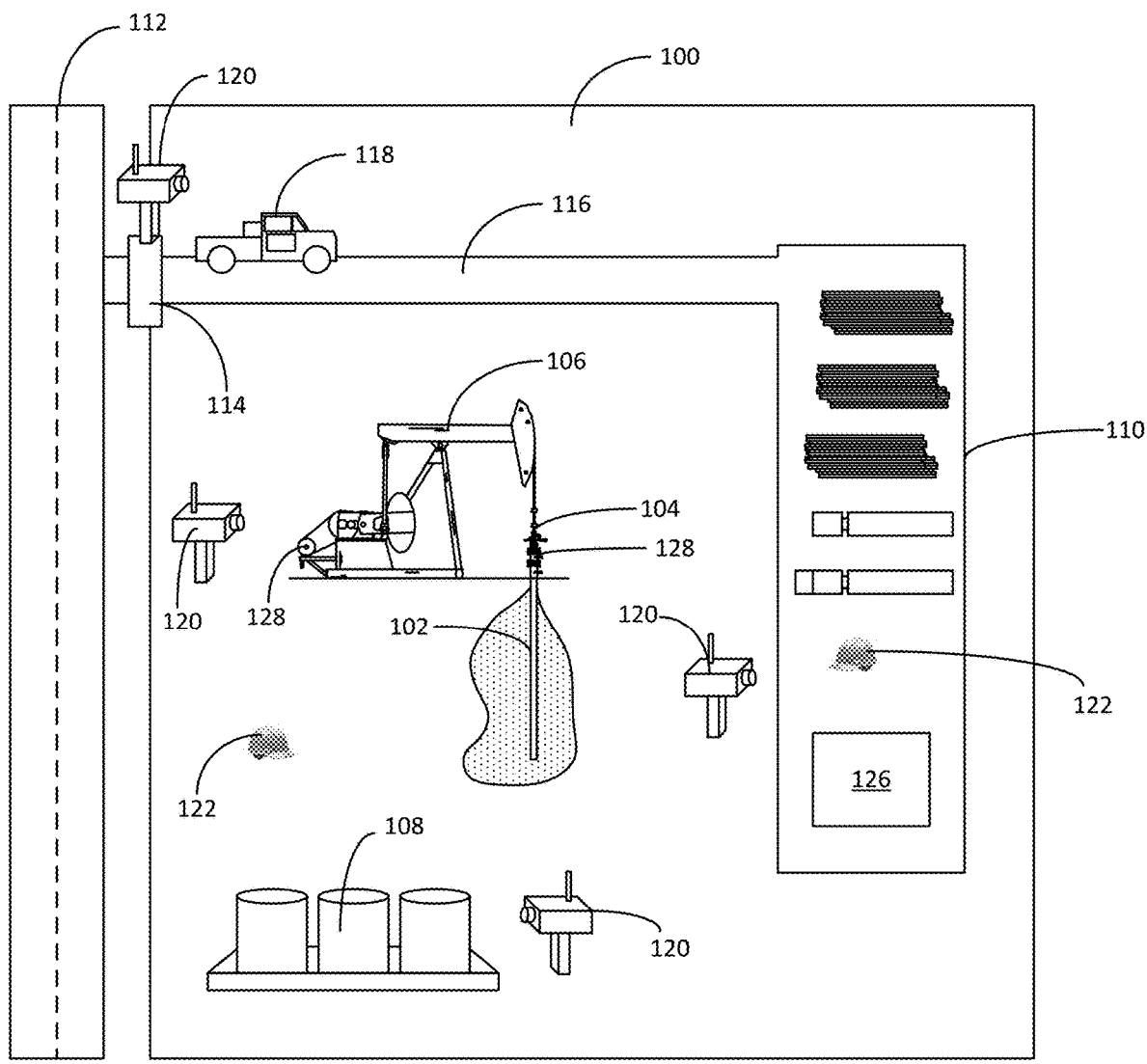

(51) Int. Cl.
*G06T 7/73* (2017.01)
*G06V 20/52* (2022.01)

(52) U.S. Cl.
CPC .............. *G06T 2207/10048* (2013.01); *G06T 2207/30164* (2013.01); *G06T 2207/30232* (2013.01); *G06V 20/52* (2022.01)

(58) Field of Classification Search
CPC ..... G06Q 10/063114; G06Q 10/06398; G06Q 10/0633
See application file for complete search history.

(56) References Cited

U.S. PATENT DOCUMENTS

| 11,823,517 | B2* | 11/2023 | Haci ...................... H04N 7/181 |
| 2008/0208475 | A1* | 8/2008 | Karr ........................ G06F 16/26 702/6 |
| 2011/0128160 | A1 | 6/2011 | Overholt et al. |
| 2012/0101953 | A1* | 4/2012 | James .................... G06Q 50/04 705/317 |
| 2015/0363738 | A1* | 12/2015 | Haci .............. G06Q 10/063114 705/7.15 |
| 2016/0118085 | A1* | 4/2016 | Ptitsyn .................. G11B 27/32 386/241 |
| 2016/0130917 | A1* | 5/2016 | Torrione ................. E21B 41/00 348/85 |
| 2016/0307143 | A1* | 10/2016 | Mongeon ................ G06F 3/017 |
| 2016/0364661 | A1* | 12/2016 | Hurst ..................... G11B 27/34 |
| 2017/0140469 | A1 | 5/2017 | Finkel et al. |
| 2017/0145807 | A1 | 5/2017 | Wendorf et al. |
| 2017/0154341 | A1* | 6/2017 | Gilbertson .............. G06F 21/35 |
| 2017/0285622 | A1 | 10/2017 | Figoli et al. |
| 2018/0006748 | A1* | 1/2018 | Quezada ................ H04H 20/61 |
| 2019/0018871 | A1* | 1/2019 | Zheng ................. G06F 16/2455 |
| 2019/0078426 | A1* | 3/2019 | Zheng ..................... E21B 44/00 |
| 2019/0197354 | A1* | 6/2019 | Law .......................... G06N 3/04 |
| 2019/0197424 | A1 | 6/2019 | Grehant |
| 2019/0213525 | A1* | 7/2019 | Haci ....................... E21B 41/00 |
| 2020/0110398 | A1 | 4/2020 | Cella et al. |
| 2020/0126386 | A1 | 4/2020 | Michalopulos et al. |
| 2020/0167931 | A1* | 5/2020 | Ge ......................... G06T 7/0004 |
| 2020/0294390 | A1* | 9/2020 | Rao .................... G08B 13/19613 |
| 2021/0342755 | A1* | 11/2021 | Mossoba ................ G06N 20/00 |
| 2021/0366256 | A1* | 11/2021 | Michalopulos ......... E21B 44/00 |
| 2021/0398045 | A1* | 12/2021 | Hanebeck ........ G06Q 10/06315 |
| 2022/0131867 | A1* | 4/2022 | Kojima ................ H04L 63/102 |
| 2024/0020813 | A1* | 1/2024 | Weber .................... G06V 40/28 |

FOREIGN PATENT DOCUMENTS

| WO | WO-2013006165 A1 * | 1/2013 | ............. E21B 21/10 |
| WO | WO-2022081881 A1 * | 4/2022 | ......... G06K 9/00711 |

OTHER PUBLICATIONS

ISA/US; Search Report and Written Opinion for PCT/US22/16210 mailed May 13, 2022.
Ellis, Keith, Wireless Monitoring Saves Hours on Each Well Workover; Oil & Gas Engineering, https://www.oilandgaseng.com/articles/wireless-monitoring-saves-hours-on-each-well-workover; May 29, 2019.
Saeed, Saad, et al., Event Detection for Managed-Pressure Drilling: A New Paradigm; 2012 SPE Annual Technical Conference and Exhibition, San Antonio, TX, Oct. 8, 2012.

* cited by examiner

OPERATION IDENTIFICATION OF SEQUENTIAL EVENTS

RELATED APPLICATIONS

This application claims the benefit of U.S. Provisional Patent Application Ser. No. 63/149,659 entitled, "Operation Identification of Sequential Events" filed Feb. 15, 2021, the disclosure of which is herein incorporated by reference.

FIELD OF THE INVENTION

This invention relates generally to the field of monitoring systems, and more particularly but not by way of limitation, to a system and method for automatically determining whether particular events have taken place at a remote location using computer-enabled vision.

BACKGROUND

Many of the most productive oil and gas assets are located in remote areas, with equipment and personnel often distributed over a large area. In these areas, it is particularly difficult to obtain real-time or near real-time monitoring of equipment, conditions and the status of operations. Numerous operations take place at remote well sites, with a variety of well operators, service companies, and other vendors. Determining whether a particular task or operation has been completed typically requires onsite personnel, which can be expensive, inefficient and dangerous.

In addition to monitoring the remote well site for ensuring safe and optimized operations, the remote nature of the wellsite creates challenges in confirming that a particular operation has been completed to the extent necessary to pay invoices for the remote operation. There is, therefore, a need for an improved system for monitoring the status of remote operations and determining whether a remote operation has been completed so that invoices can be approved and processed for the remote operation.

SUMMARY OF THE INVENTION

In one aspect, embodiments of the present disclosure are directed to a method for automatically determining whether an operator carried out a first operation on an asset positioned at a location. The method includes the steps of installing a camera module at the location to observe the asset, sending image data from the camera module to an analytics center, processing the image data to automatically determine the identity of the operator or changes at the location resulting from the first operation, developing an event signature based on the image data, wherein the event signature is indicative of whether the first operation on the asset took place, and verifying the status of the first operation based on the event signature.

In another aspect, embodiments of the present disclosure are directed to a method for automatically determining whether an operator carried out a first operation on an asset positioned at a location. In this embodiment, the method includes the steps of installing a camera module at the location to observe the asset, sending image data from the camera module to an analytics center, processing the image data to automatically determine the identity of the operator or changes at the location resulting from the first operation, developing an event signature based on the image data, wherein the event signature is indicative of whether the first operation on the asset took place, verifying the status of the first operation based on the event signature, and automatically processing an invoice for the first operation based on the step of verifying the status of the operation.

In yet another aspect, embodiments of the present disclosure are directed to a method for automatically determining whether an operator carried out a first operation on an asset positioned at a location. In this embodiment, the method includes the steps of installing a camera module at the location to observe the asset, sending image data from the camera module to an analytics center, processing the image data to automatically determine the identity of the operator or changes at the location resulting from the first operation, developing an event signature based on the image data, wherein the event signature is indicative of whether the first operation on the asset took place, verifying the status of the first operation based on the event signature, and automatically commanding a second operation based on the step of verifying the status of the first operation.

BRIEF DESCRIPTIONS OF THE DRAWINGS

FIG. 1 is an illustration of a remote wellsite that incorporates a computer vision monitoring system.

Figure 2:
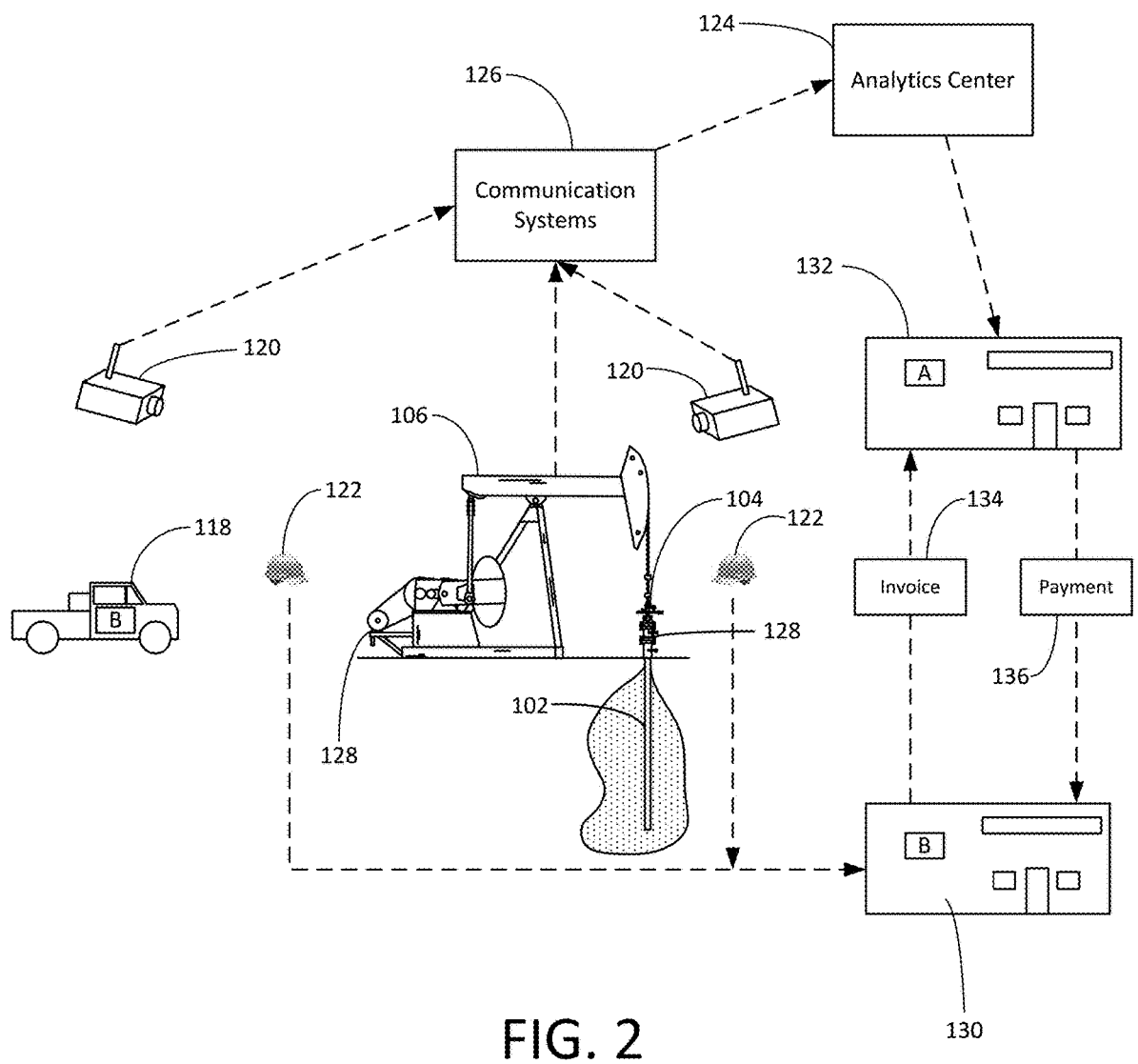

FIG. 2 provides a data flow diagram showing the exchange of information between offices and a remote wellsite.

Figure 3:
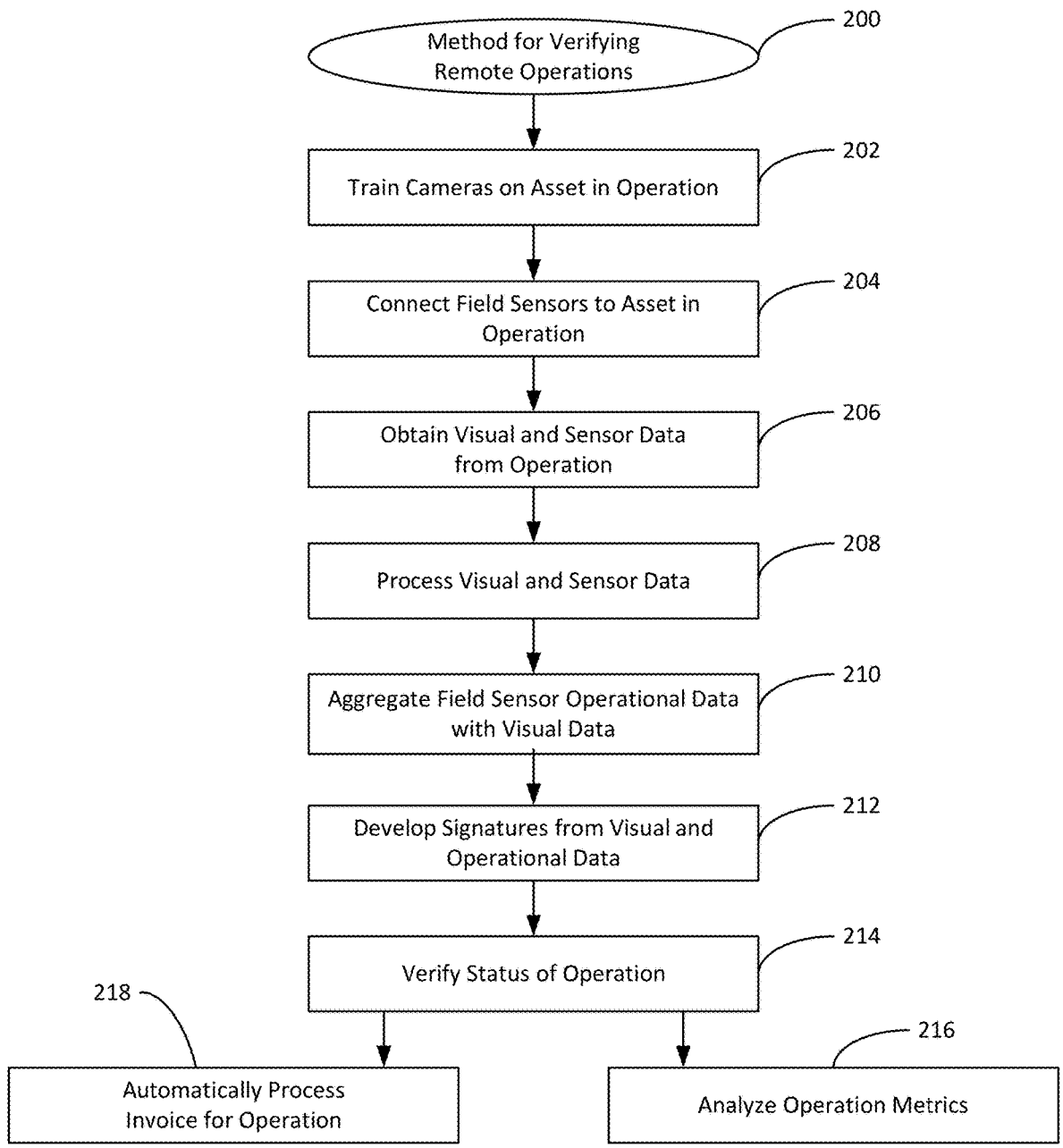

FIG. 3 is a process flow diagram of a method for automatically identifying the status of operations taking place at a remote location.

WRITTEN DESCRIPTION

Beginning with FIG. 1, shown therein is a depiction of a well site 100 that includes a well 102 that has been drilled for the production of products from an underground reservoir. The well 100 includes a wellhead 104 and an artificial lift system 106. The well site 100 may also include other assets and equipment, such as a tank battery 108 and an equipment yard 110. Access to the well site 100 is provided from an external road 112 through an access gate 114 to an internal road 116. Vehicles 118 move from the external road 112 to the equipment yard 110 along the internal road 116.

The well site 100 includes a number of camera modules 120 that are configured to observe activities, objects and personnel 122 within the well site 100. The camera modules 120 may each include one or more sensors, including visual range detectors, active IR systems, and passive thermal imaging sensors. In this way, the camera modules 120 can be configured to operate as both conventional digital video recorders and IR/thermal digital scanners. As illustrated in the functional data flow diagram in FIG. 2, the camera modules 120 are connected to an analytics center 124 through a communications system 126.

The communications system 126 is also configured to transmit data from field sensors 128 at the well site 100. The field sensors 128 may include, for example, sensors on the artificial lift system 106, sensors on the wellhead 104, sensors within the well 102, RFID scanners, optical code scanners, wireless radio/phone scanners, and vehicle detection sensors. The field sensors 128 can be configured to transmit data to the analytics center 124 directly or through the communications system 126. It will be appreciated that the analytics center 124 and communications system 126 can include computer equipment that can be consolidated within a single location (e.g., the well site 100) or distributed between facilities over a data network. In some embodiments, the data from the camera modules 120 and field sensors 128 is streamed to the analytics center 124 in real-time (or near real-time). In other embodiments, the data from the camera modules 120 and field sensors 128 is recorded on local devices within the well site 100 and then uploaded or otherwise transferred to the analytics center 124 in a batched process.

Generally, the analytics center 124 is configured to process and analyze the data output by the camera modules 120 and field sensors 128. The analytics center 124 is optimally configured to apply optimization, machine learning and artificial intelligence to the various inputs to the analytics center 124 to determine the identity of objects and personnel at the well site 100. The analytics center 124 can, for example, be trained to detect from the image data provided by the camera module specific types of vehicles, equipment and personnel entering, exiting and operating within the well site 100. The analytics center 124 can be adapted to automatically determine company-specific affiliations of personnel 122, vehicles 118 and equipment based on logos and color schemes visible to the camera modules 120.

The vehicles 118 and personnel 122 can be tracked as they move around the well site 100. The location and time information recorded for the vehicles 118 and personnel 122 can be combined with information obtained from the field sensors 128 to create event signatures indicative of a particular operation taking place at the well site 100. For example, the analytics center 124 can be adapted to automatically determine that a vehicle 118 belonging to Service Company B entered through the access gate 114 at 10:00 am. The camera modules 120 detected that the vehicle 118 proceeded along the internal road 116 to the wellhead 104. By automatically recognizing the logo on hardhats worn by the personnel 122, the camera modules 120 and analytics center 124 were able to determine that Service Company B personnel 122 were at the wellhead 104 at 10:15 am.

The analytics center 124 paired the spatial and temporal information about the personnel 122 with data produced by the field sensors 128 at the wellhead 104 to produce an "event signature" that indicates the personnel 122 from Service Company B opened a choke valve on the wellhead 104 to increase the production of hydrocarbons from the well 102. In this way, the camera modules 120, field sensors 128 and analytics center 124 together form an "automatic event detection" system that is capable of automatically determining an event signature that represents: (i) that a particular event or operation has occurred; (ii) when the event or operation took place; and (iii) which personnel 122 (and company) were responsible for the event or the operation. The event signatures can be stored within a database at the analytics center 124 for future review.

The automatic determination of when an event took place at the well site 100 can be used to closely monitor the operation of the well site 100 to improve the efficient, safe and economic recovery of hydrocarbons from the well 102. For example, the automatic event detection system can be used to assess the impact of certain operations carried out by teams of personnel 122 at the well site 100.

In another aspect, the automatic detection of events at the well site 100 can be used to facilitate the processing of invoices attributable to the event. For example, on a specified date, Service Company B 130 was engaged by well site Operator A 132 to adjust the operation of the artificial lift system 106 at the well site 100. The analytics center 124 used data from the camera modules 120 and field sensors 128 to identify an event signature that is consistent with operation for which Service Company B was engaged. The camera modules 120 detected personnel 122 from Service Company B at the artificial lift system 106, and field sensors 128 detected changes in the operation of the artificial lift system 106 and production of hydrocarbons from the well 102.

As illustrated in FIG. 2, an invoice 134 for the operation has been sent by Service Company B 130 to Operator A 132 for payment. Using the database created by the automatic event detection system, Operator A 132 determines that the event noted in the invoice 134 took place on the specified date. Operator A 132 then issues payment 136 for the invoice 134. In some embodiments, an accounts payable employee at Operator A 132 checks the automatic event detection system database and manually instructs the issuance of the payment 136. In other embodiments, payment process takes place automatically without human intervention. The invoice 134 is processed by computer systems at Operator A 132, compared against the automatic event detection system database, and, if authorized by a match between the event database and the invoiced operation, the payment 136 is automatically routed to Service Company B 130.

Turning to FIG. 3, shown therein is a simplified method 200 for verifying that an operation has taken place at a remote location, such as the well site 100. Although the method 200 is disclosed in connection with an operation or event at the well site 100, it will be appreciated that the method 200 can find utility in monitoring operations at any location (e.g., construction sites, park operations, mining operations, pipeline projects, etc.). The method begins at step 202, when camera modules 120 are trained on assets or personnel 122 at the remote location and connected to the analytics center 124. At step 204, field sensors 128 are placed on various equipment or assets at the remote location, and connected to the analytics center 124.

At step 206, image and sensor data is harvested by the camera modules 120 and field sensors 128, respectively, and sent to the analytics center 124. At step 208, the image data is processed and analyzed by the analytics center 124. At step 210, the asset operational data from the field sensors 128 is aggregated at the analytics center 124. Next, at step 212, the analytics center 124 pairs the image data and operational data together to form event signatures. At step 214, the event signatures are used to automatically determine or predict whether a particular event or operation has taken place. In some embodiments, the method 200 stops at step 214. The determination of event signatures can then be used for a variety of purposes.

For example, the method 200 can proceed to step 216, where the event signatures are used to optimize the operation of equipment and personnel at the remote location. Correlations can be made between ongoing operations and steps taken by personnel 122 at the remote location. These correlations can be used to optimize future operations at the remote location. In another example, the method moves to step 218, where the event signatures are used to determine whether a particular operation has successfully taken place at the remote location for the purpose of approving invoices issued for that operation. The ability to automatically determine whether a particular entity has successfully completed a prescribed operation at the remote location significantly improves the efficiency of processing invoices for that operation.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed.

What is claimed is:

1. A method for automatically determining whether an operator carried out a first operation on an asset positioned at a location, the method comprising the steps of:
    installing a camera module at the location to observe the asset;
    obtaining operational data measurements for the asset;
    sending image data from the camera module to an analytics center;
    processing the image data to automatically determine the identity of the operator or changes at the location resulting from the first operation;
    developing an event signature based on the image data and operational data measurements for the asset, wherein the event signature is indicative of whether the first operation on the asset took place; and
    verifying the status of the first operation based on the event signature.

2. The method of claim 1, wherein the location is a remote well site.

3. The method of claim 2, wherein the camera module is configured to output image data comprising visible light images and infrared images.

4. The method of claim 1, further comprising the steps of:
    connecting a field sensor to the asset to obtain the operational data measurements for the asset;
    sending the operational data from the field sensor to the analytics center; and
    aggregating the image data and the operational data.

5. The method of claim 1, wherein the asset is selected from a group consisting of a wellhead, an artificial lift system, a tank battery, an access gate, and an equipment yard.

6. The method of claim 1, further comprising the step of automatically processing an invoice for the first operation based on the step of verifying the status of the operation.

7. The method of claim 1, further comprising the step of automatically commanding a second operation based on the step of verifying the status of the first operation.

8. A method for automatically determining whether an operator carried out a first operation on an asset positioned at a location, the method comprising the steps of:
    installing a camera module at the location to observe the asset;
    sending image data from the camera module to an analytics center;
    obtaining operational data measurements for the asset;
    processing the image data to automatically determine the identity of the operator or changes at the location resulting from the first operation;
    developing an event signature based on the image data and the operational data measurements for the asset, wherein the event signature is indicative of whether the first operation on the asset took place;
    verifying the status of the first operation based on the event signature; and
    automatically processing an invoice for the first operation based on the step of verifying the status of the operation.

9. The method of claim 8, wherein the location is a remote well site.

10. The method of claim 8, wherein the camera module is configured to output image data comprising visible light images and infrared images.

11. The method of claim 8, further comprising the steps of:
    connecting a field sensor to the asset to obtain the operational data measurements for the asset;
    sending the operational data from the field sensor to the analytics center; and
    aggregating the image data and the operational data.

12. The method of claim 8, wherein the asset is selected from a group consisting of a wellhead, an artificial lift system, a tank battery, an access gate, and an equipment yard.

13. The method of claim 8, further comprising the step of automatically commanding a second operation based on the step of verifying the status of the first operation.

14. A method for automatically determining whether an operator carried out a first operation on an asset positioned at a location, the method comprising the steps of:
    installing a camera module at the location to observe the asset;
    sending image data from the camera module to an analytics center;
    processing the image data to automatically determine the identity of the operator or changes at the location resulting from the first operation;
    obtaining operational data measurements for the asset;
    developing an event signature based on the image data and the operational data measurements for the asset, wherein the event signature is indicative of whether the first operation on the asset took place;
    verifying the status of the first operation based on the event signature; and
    automatically commanding a second operation based on the step of verifying the status of the first operation.

15. The method of claim 14, wherein the camera module is configured to output image data comprising visible light images and infrared images.

16. The method of claim 14, further comprising the steps of:
    connecting a field sensor to the asset to obtain the operational data measurements for the asset;
    sending the operational data from the field sensor to the analytics center; and
    aggregating the image data and the operational data.

17. The method of claim 16, wherein the asset is selected from a group consisting of a wellhead, an artificial lift system, a tank battery, an access gate, and an equipment yard.

* * * * *